United States Patent
Davis

[15] 3,656,024
[45] Apr. 11, 1972

[54] TRANSIENT PROTECTION FOR ELECTRICAL IRRIGATION CONTROL SYSTEMS

[72] Inventor: Wayne Edward Davis, Bricktown, N.J.
[73] Assignee: Johns-Manville Irrigation Corporation, New York, N.Y.
[22] Filed: Mar. 19, 1971
[21] Appl. No.: 126,220

[52] U.S. Cl. .................................. 317/20, 307/93, 317/50, 317/61.5
[51] Int. Cl. ........................................................ H02h 9/04
[58] Field of Search .......................... 317/61.5, 11 E, 50, 20; 307/93; 323/9

[56] References Cited

UNITED STATES PATENTS

| | | | |
|---|---|---|---|
| 1,300,127 | 4/1919 | Creighton | 317/61.5 |
| 3,066,260 | 11/1962 | Scholes et al. | 317/61.5 X |
| 3,530,349 | 9/1970 | Royer et al. | 307/93 X |

FOREIGN PATENTS OR APPLICATIONS

| | | | |
|---|---|---|---|
| 289,997 | 2/1916 | Germany | 317/61.5 |

Primary Examiner—James D. Trammell
Attorney—John A. McKinney, Robert M. Krone, Joseph J. Kelly and Ronald M. Halvorsen

[57] ABSTRACT

Current induced in an electrical irrigation control system by lightning, for example, is delayed and discharged around the relay contacts and solid state components of the individual sprinkler control units by high current capacity, quick-acting bi-directional gas diodes.

7 Claims, 2 Drawing Figures

Patented April 11, 1972
3,656,024
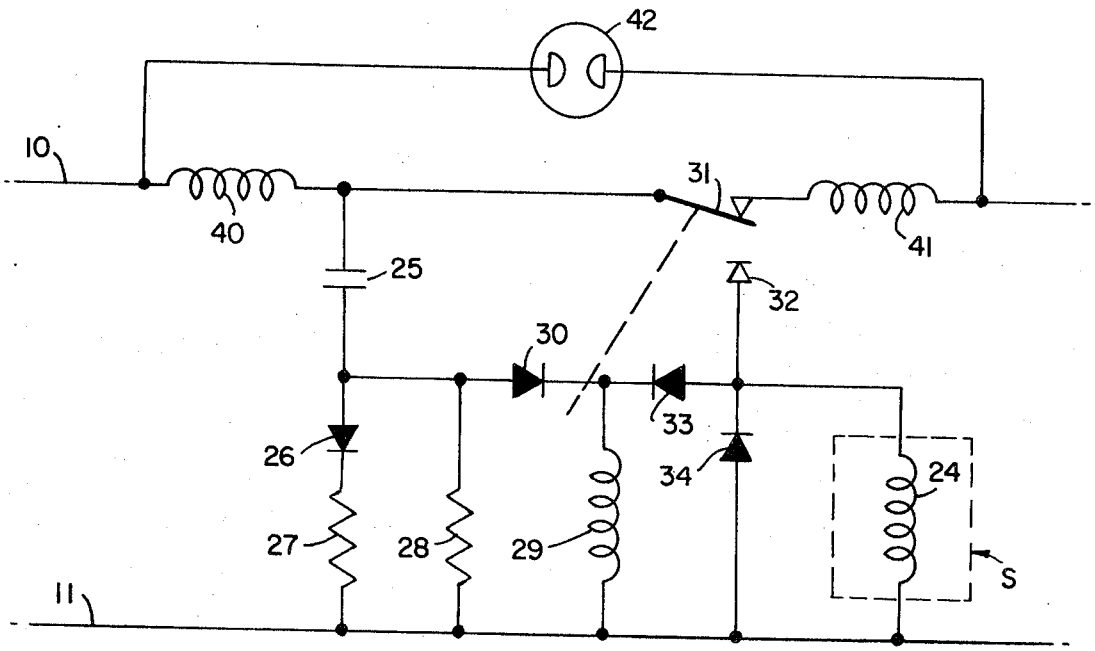
FIG_1
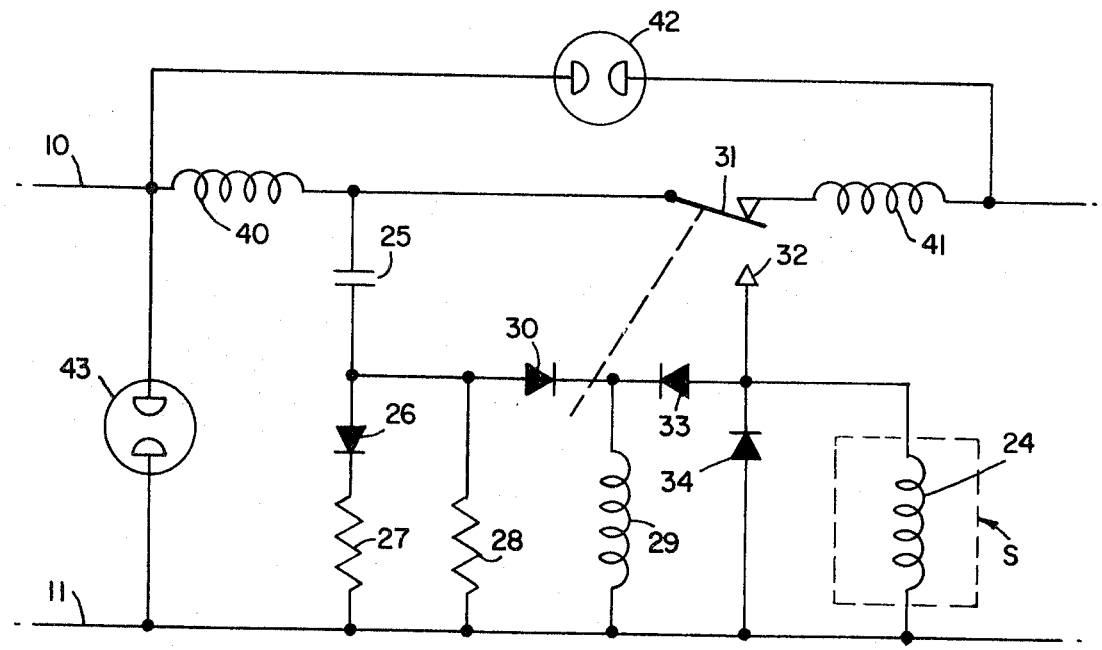
FIG_2
INVENTOR.
WAYNE EDWARD DAVIS
BY *Robert M. Krone*
ATTORNEY

TRANSIENT PROTECTION FOR ELECTRICAL IRRIGATION CONTROL SYSTEMS

BACKGROUND OF THE INVENTION

This invention relates generally to electrical irrigation control systems for operating solenoid sprinkler valves of the type disclosed in U.S. Pat. No. 3,521,103 for Sequential Operating System and, more particularly, relates to means for protecting the control units of such systems from transient voltage and current surges induced by lightning and the like.

Voltage transients induced by lightning and other causes in lengthy and spread-out electrical control networks on golf courses and other irrigation systems present serious reliability and life-expectancy problems in control components such as semiconductors, similarly delicate components or ordinary relay contacts. Protection against these induced voltage and accompanying current surges requires high current-carrying capability, at least for short time intervals and very fast reaction time.

BRIEF SUMMARY OF THE INVENTION

One object of this invention is to provide protection for the relay contacts and solid state components of control units of an electrical irrigation control system from large induced transient voltage and current surges.

Another object of the invention is to provide fast-reacting, high current-carrying transient voltage protection for irrigation system control units which is reliable, inexpensive and does not affect normal operation.

A further object of the invention is to provide transient voltage protection for irrigation system control units which is essentially bi-directional.

BRIEF DESCRIPTION OF THE DRAWINGS

Various other objects of this invention will become apparent from a consideration of the following description of an illustrative embodiment and the accompanying drawings wherein FIG. 1 is a schematic diagram of the circuit for a typical solid state control unit with transient voltage protection for its relay contacts; and FIG. 2 is a schematic diagram of the solid state control unit with transient voltage protection both for its relay contacts and its solid state components.

DESCRIPTION OF THE PREFERRED EMBODIMENT

FIGS. 1 and 2 illustrate typical control units useful in irrigation control systems of the type described in W. E. Davis, et al. U.S. Pat. No. 3,521,130 for Sequential Operating System issued on July 21, 1970. One of these control units is provided for each solenoid-operated sprinkler valve of an extended irrigation system for a golf course, for example. The control units are connected into an essentially two-wire system which normally supplies them with a series of operating and stepping pulses as is more particularly described in the identified patent.

In a typical control unit, conducting means 10 and 11, which "float" and are not grounded, supply stepping and operational pulses to the several control units connected in sequence. Each of these particular control units includes a capacitor 25 connected in series with diode 26 and resistor 27 across the conducting means 10, 11. A second resistor 28 having a higher resistance than resistor 27 is in parallel with diode 26 and resistor 27, connecting the juncture between capacitor 25 and diode 26. A relay coil 29 also connects that juncture through diode 30 to conducting means 11. The values of resistors 27, 28 and diode 26 are selected to develop in capacitor 25 a fast charging rate and a relatively slower discharge rate.

To operate the particular sprinkler, a voltage pulse at the operating level rapidly charges capacitor 25 through diode 26 and resistor 27. Part of the charging current also flows through diode 30 to energize coil 29 and open the control unit interrupting means, here shown as a normally closed contactor 31 of a single pole double-throw relay. The relay contactor 31 simultaneously opens wire 10 to subsequent control units in the sequence and closes normally open relay contact 32. This establishes both a holding current through diode 33 and relay coil 29 to line 11 and an operating current which energizes coil 24 of the solenoid sprinkler valve S. Diode 34 between conducting means 11 and relay contact 32 is in parallel with and protects solenoid coil 24.

The extensive and spread-out wire networks of irrigation control systems are susceptible to large transient voltages and accompanying current induced in them by lightning striking in the vicinity, static discharges between a line and the electric field in the atmosphere or other causes. The normally closed relay contactors 31 and the solid state components of the control units in the system are particularly vulnerable to these surges. Transient voltage or current surges passing through normally closed relay contactor 31 can cause welding or serious damage to the relay contacts or can damage the solid state components of the control unit itself.

Protection against such voltage and accompanying current surges is provided by a pair of delay means 40, 41 and gas diodes 42, 43. The delay means 40, 41 are connected in one of the two-wire conducting means (10) in series with relay contactor 31. The delay means can be the illustrated inductance coils connected external to the control unit circuitry. They should have low d-c resistance so as to interfere as little as possible with the normal d-c operation of the control system and should have an inductance in the order of 100 to 200 microhenries for a control unit having the circuit values disclosed in U.S. Pat. No. 3,521,130. Miniature inductance coils, such as Miller No. 5250, having 100 microhenry inductance and 0.21 ohms resistance are useful.

The inductance of either delay means 40, 41 when exposed to a transient voltage surge delays the corresponding induced current flow to the normally closed relay contactor 31 until that voltage can build up across a bi-directional gas diode 43 to the striking voltage of the diode. At that voltage the diode 43, which is connected in parallel with the series connected delay means and interrupting means, conducts either in its "-glow" or "arc" discharge state and passes the induced transient current around relay contactor 31 and, indeed, around the control unit itself.

Similarly, a gas diode 43 also can be connected between conducting means 10, 11 at each control unit to discharge voltages which might occur between the two wires 10, 11 across the control unit. Surge voltages induced in the control system because of mutual inductance between the two wires 10, 11 normally are the same in both conducting means since they float at a voltage level above ground. However, if one of the wires were accidentally or otherwise grounded or the conducting means voltage levels were to differ abnormally, gas diode 43 discharges transients around the control unit.

Small bi-directional button type cold-cathode gas diodes having the requisite rapid response and high current-carrying capability are useful in the system such as Siemens type Bl–C90/20. The quick response of such devices will discharge up to 500 amperes of surge current for a period of 500 microseconds for a fast rising transient such as that induced by lightning in the system which typically reaches the diode striking voltage of about 90 volts in one microsecond.

The specific embodiment illustrated has been described for illustrative purposes only and it should be understood that various modifications in the circuitry may be made without departing from the invention defined in the appended claims.

I claim:

1. In an irrigation system having a sequence of solenoid-operated normally closed valves, an essentially two-wire conducting means for carrying operating current in series to the solenoids of said valves, and a plurality of control units, each having normally closed interrupting means for disconnecting the conducting means from those control units and valve solenoids subsequent to it in the sequence, improved means for transient protection for each control unit comprising a pair of current delay means in one wire of the conducting means and in series with the interrupting means of the control unit, one being on each side of the control unit and external to its circuit; and a gas diode in parallel with the series connected pair of delay means and interrupting means.

2. The improved means for transient protection of claim 1 wherein each gas diode conducts bi-directionally.

3. The improved means for transient protection of claim 1 wherein each gas diode conducts in the order of 500 amperes for a period of 500 microseconds upon application of a sharply rising voltage in the order of 90 volts.

4. The improved means for transient protection of claim 1 wherein each of said delay means is an inductance coil having low d-c resistance and an inductance sufficient to delay current flow to said interrupting means at least until the diode conducts.

5. The improved means for transient protection of claim 4 wherein each of said inductance coils has an inductance in the order of 100–200 microhenries.

6. In an irrigation system having a sequence of solenoid-operated normally closed valves, an essentially two-wire conducting means for carrying operating current in series to the solenoids of said valves, and a plurality of control units, each having normally closed interrupting means for disconnecting the conducting means from those control units and valve solenoids subsequent to it in the sequence, improved means for transient protection for each control unit comprising a pair of current delay means in one wire of the conducting means and in series with the interrupting means of the control unit, one being on each side of the control unit and external to its circuit;

a first gas diode in parallel with the series connected pair of delay means and interrupting means; and a second gas diode connected across the two wires of the conducting means at each control unit external to its circuit and to the series connected pair of delay means and interrupting means.

7. The improved means for transient protection of claim 6 wherein the two wires of the conducting means float at a potential above ground.

* * * * *